United States Patent
Liu et al.

(10) Patent No.: US 11,234,291 B2
(45) Date of Patent: Jan. 25, 2022

(54) METHOD AND APPARATUS FOR SUSPENDING RRC CONNECTION, AND COMPUTER STORAGE MEDIUM

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/015,860

(22) Filed: Sep. 9, 2020

(65) Prior Publication Data

US 2020/0413477 A1 Dec. 31, 2020

Related U.S. Application Data

(63) Continuation of application No. PCT/CN2018/085910, filed on May 7, 2018.

(51) Int. Cl.
*H04W 76/38* (2018.01)
*H04W 76/15* (2018.01)
(Continued)

(52) U.S. Cl.
CPC ......... *H04W 76/38* (2018.02); *H04W 68/005* (2013.01); *H04W 76/15* (2018.02);
(Continued)

(58) Field of Classification Search
CPC ...... H04W 76/38; H04W 76/15; H04W 76/28
See application file for complete search history.

(56) References Cited

U.S. PATENT DOCUMENTS 9,060,028 B1 * 6/2015 Azem .................. H04W 12/08
9,699,702 B2 * 7/2017 Fujishiro ............... H04W 36/06
(Continued)

FOREIGN PATENT DOCUMENTS

CN 106961747 A 7/2017
CN 107404762 A 11/2017
(Continued)

OTHER PUBLICATIONS

International Search Report in the international application No. PCT/CN2018/085910, dated Feb. 12, 2019.
(Continued)

*Primary Examiner* — Parth Patel
(74) *Attorney, Agent, or Firm* — Perkins Coie LLP

(57) ABSTRACT

A method and device for suspending an RRC connection are provided. The method comprises: the first node sends a first notification message to a second node, and negotiates with the second node about whether the RRC connection is required to be suspended, wherein the first notification message is used for notifying the second node that the first node determines that the RRC connection is required to be suspended; if a result of the negotiation between the first node and the second node is that the RRC connection is required to be suspended, the first node sends a first suspension command to a terminal device, the first suspension command being used for triggering the terminal device to suspend the RRC connection and enter an RRC inactive state.

6 Claims, 4 Drawing Sheets

(51) Int. Cl.
  *H04W 76/28* (2018.01)
  *H04W 76/27* (2018.01)
  *H04W 68/00* (2009.01)
  *H04W 88/10* (2009.01)
(52) U.S. Cl.
  CPC .......... *H04W 76/27* (2018.02); *H04W 76/28* (2018.02); *H04W 88/10* (2013.01)

(56) References Cited

U.S. PATENT DOCUMENTS

| | | | |
|---|---|---|---|
| 10,834,570 B2* | 11/2020 | Kim | H04W 8/08 |
| 2004/0224669 A1* | 11/2004 | Pedlar | H04W 76/27 455/412.1 |
| 2012/0208527 A1* | 8/2012 | Park | H04W 76/38 455/423 |
| 2013/0039287 A1* | 2/2013 | Rayavarapu | H04W 76/28 370/329 |
| 2015/0043403 A1* | 2/2015 | Martinez Tarradell | H04W 72/082 370/311 |
| 2015/0050935 A1* | 2/2015 | Maniatis | H04W 36/0011 455/437 |
| 2015/0312942 A1* | 10/2015 | Cui | H04W 28/14 370/329 |
| 2016/0112921 A1* | 4/2016 | Nagasaka | H04W 36/02 370/331 |
| 2016/0192433 A1* | 6/2016 | Deenoo | H04W 72/046 370/329 |
| 2016/0242106 A1* | 8/2016 | Ueki | H04W 76/16 |
| 2016/0302153 A1* | 10/2016 | Martin | H04W 76/27 |
| 2017/0013668 A1* | 1/2017 | Chang | H04W 76/22 |
| 2017/0064769 A1* | 3/2017 | Zhang | H04W 76/25 |
| 2017/0188278 A1* | 6/2017 | Ohta | H04W 36/04 |
| 2017/0195930 A1* | 7/2017 | Tomici | H04W 12/08 |
| 2017/0245213 A1* | 8/2017 | Martinez Tarradell | H04L 5/0048 |
| 2017/0332435 A1* | 11/2017 | Tenny | H04W 76/10 |
| 2017/0347277 A1 | 11/2017 | Zhang et al. | |
| 2018/0110087 A1* | 4/2018 | Cai | H04W 76/27 |
| 2018/0199245 A1* | 7/2018 | Futaki | H04W 36/0033 |
| 2018/0220483 A1* | 8/2018 | Hayashi | H04W 16/32 |
| 2018/0249388 A1* | 8/2018 | Baek | H04W 40/06 |
| 2018/0270889 A1* | 9/2018 | Leroux | H04W 76/15 |
| 2018/0288735 A1* | 10/2018 | Walldeen | H04W 4/70 |
| 2018/0295670 A1* | 10/2018 | Decarreau | H04W 76/15 |
| 2019/0007993 A1* | 1/2019 | Bergquist | H04W 76/27 |
| 2019/0021134 A1* | 1/2019 | Zhang | H04W 76/10 |
| 2019/0037634 A1* | 1/2019 | Kadiri | H04W 12/003 |
| 2019/0052607 A1* | 2/2019 | Ohlsson | H04W 76/28 |
| 2019/0159053 A1* | 5/2019 | Tsuda | H04B 17/309 |
| 2019/0166576 A1* | 5/2019 | Kim | H04W 36/08 |
| 2019/0254104 A1* | 8/2019 | Gurumoorthy | H04W 76/27 |
| 2019/0306917 A1* | 10/2019 | Takahashi | H04W 72/12 |
| 2019/0313333 A1* | 10/2019 | Kim | H04W 48/20 |
| 2019/0313476 A1* | 10/2019 | Sun | H04W 72/0446 |
| 2019/0342148 A1* | 11/2019 | Hong | H04W 76/15 |
| 2019/0350040 A1* | 11/2019 | Liu | H04W 52/0229 |
| 2019/0387569 A1 | 12/2019 | Martinez Tarradell et al. | |
| 2020/0015112 A1* | 1/2020 | Kim | H04W 48/02 |
| 2020/0113012 A1* | 4/2020 | Lee | H04W 28/02 |
| 2020/0120547 A1* | 4/2020 | Han | H04W 76/30 |
| 2020/0146053 A1* | 5/2020 | Tang | H04W 74/0833 |
| 2020/0163151 A1* | 5/2020 | Nakarmi | H04W 12/04031 |
| 2020/0169922 A1 | 5/2020 | Ozturk | |
| 2020/0187154 A1* | 6/2020 | Li | H04W 64/00 |
| 2020/0196232 A1* | 6/2020 | Drevo | H04W 52/0212 |
| 2020/0214073 A1 | 7/2020 | Shimoda et al. | |
| 2020/0305225 A1* | 9/2020 | Zhang | H04W 36/0022 |
| 2020/0344019 A1* | 10/2020 | Da Silva | H04L 5/0048 |
| 2020/0359443 A1* | 11/2020 | Lu | H04W 80/02 |

FOREIGN PATENT DOCUMENTS

| | | |
|---|---|---|
| CN | 107666693 A | 2/2018 |
| CN | 107959983 A | 4/2018 |
| EP | 3691400 A1 | 8/2020 |
| RU | 2578166 C1 | 3/2016 |
| TW | 201345303 A | 11/2013 |
| WO | 2013144606 A1 | 10/2013 |
| WO | 2016165127 A1 | 10/2016 |
| WO | 2018228451 A1 | 12/2018 |
| WO | 2018232124 A1 | 12/2018 |

OTHER PUBLICATIONS

Supplementary European Search Report in the European application No. 18917793.4, dated Feb. 11, 2021.
Qualcomm Incorporated: "MR-DC Mode in Inactive", 3GPP Draft; R2-1706892 MR-DC Mode Ininactive, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017, Jun. 26, 2017, XP051301389, the whole document.
ZTE Corporation: "Inactive mode handling in NSA", 3GPP Draft; R2-1708135 Inactive Mode Handling in NSA, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, Aug. 20, 2017, XP051318038, the whole document.
Ericsson: "On Coexistence between RRC inactive and dual connectivity", 3GPP Draft; R3-181253, 3rd Generation Partnership Project (3GPP), Mobile Competence Centre; 650, Route Des Lucioles; F-06921 Sophia-Antipolis Cedex; France, vol. RAN WG3, No. Athens, Greece; Feb. 26, 2018-Mar. 2, 2018, Feb. 17, 2018, XP051401700, the whole document.
First Office Action of the Russian application No. 2020138283, dated Jul. 2, 2021. 11 pages.
SA WG2 Meeting #S2-122BIS S2-175755, Aug. 21-25, 2017, Sophia Antipolis, France; Source: Qualcomm Incorporated; Title: RRC inactive and dual connectivity coexistence. 5 pages.
3GPP TSG-SA WG2 Meeting #127 S2-184343, Sanya, P.R.China, Apr. 16-20, 2018; Title: Coexistence of RRC Inactive and Dual Connectivity; Source to WG: Qualcomm Incorporated. 3 pages.
First Office Action of the Chinese application No. 202010876300.1, dated Aug. 27, 2021. 11 pages.
Office Action of the Indian application No. 202027052797, dated Sep. 10, 2021. 6 pages with English translation.

* cited by examiner if the second node determines that the service at the second node side is in the first state, and a result of the second node negotiating with the first node is that a part of the RRC connection is required to be suspended or the second node determines that a part of the RRC connection is required to be suspended, the second node sends a second suspension command to the terminal device, the second suspension command being used for triggering the terminal device to suspend the part of the RRC connection and to enter a partial RRC inactive state, the suspension of the part of the RRC connection referring to the suspension of the resources of the SCG part — 301

FIG. 3

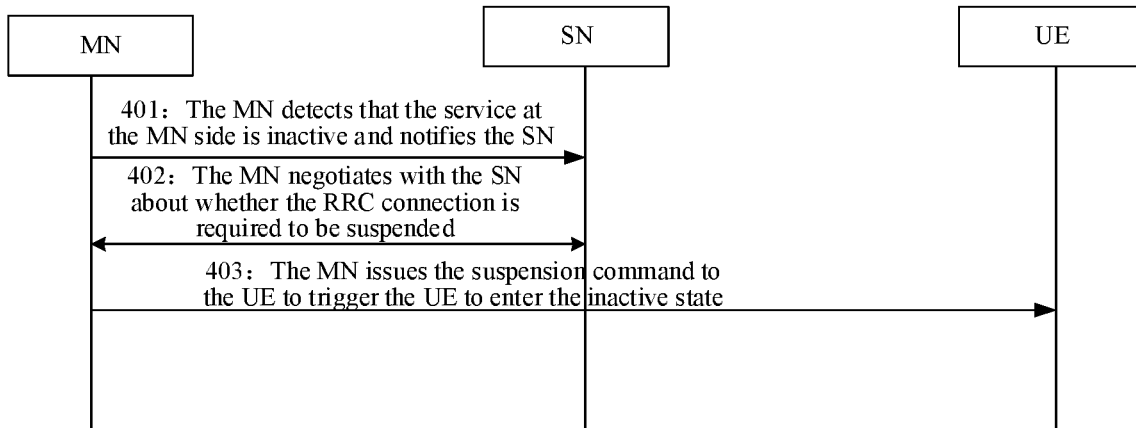

FIG. 4

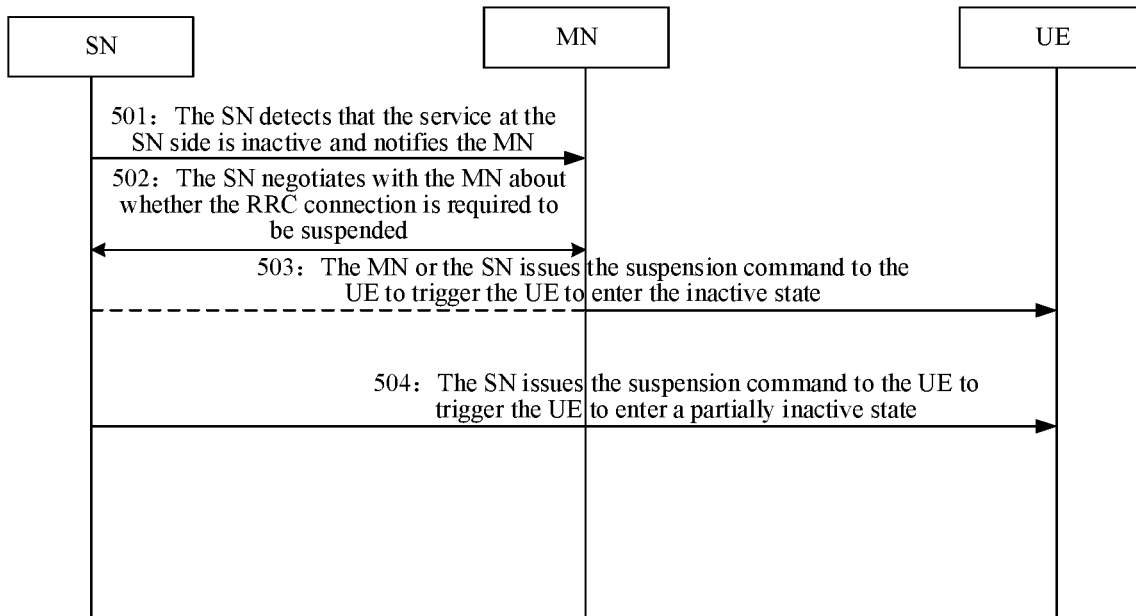

FIG. 5

METHOD AND APPARATUS FOR SUSPENDING RRC CONNECTION, AND COMPUTER STORAGE MEDIUM

CROSS-REFERENCE TO RELATED APPLICATION

This is a continuation application of International Patent Application No. PCT/CN2018/085910, filed on May 7, 2018, the contents of which are hereby incorporated by reference in its entirety.

BACKGROUND

To meet people's pursuit of speed, delay, high-speed mobility and energy efficiency of services, as well as the diversity and complexity of services in future life, the 3rd Generation Partnership Project (3GPP) International Standards Organization begins to develop a 5th Generation (5G) mobile communication technology.

The main application scenarios of the 5G mobile communication technology are as follows: Enhance Mobile Broadband (eMBB), Ultra Reliable Low Latency Communication (URLLC), and massive Machine Type Communication (mMTC).

In a 5G network environment, a new RRC state, namely an RRC_INACTIVE state, is defined for the purpose of reducing air interface signaling, and quickly resuming wireless connection and data service. This state is different from an RRC_IDLE state and an RC_CONNECTED state.

When User Equipment (UE) is in the RRC_INACTIVE state, a network side configures a paging area of Radio Access Network (RAN) for the UE through a dedicated signaling. The paging area of RAN may be one cell or more cells. When the UE moves in the area, the network side is not notified, and a mobile behavior under an idle state, namely a re-selection principle of cell selection, is followed. When the UE moves out of the configured paging area of RAN, the UE is triggered to resume an RRC connection and reacquire the configured paging area of RAN. When the UE has downlink data arriving, a base station (e.g. gNB) that maintains a connection between the RAN and a Core Network (CN) for the UE triggers all cells within the paging area of RAN to send paging messages to the UE, so that the UE in an inactive state can resume the RRC connection for data reception.

So the UE goes from the inactive state to the RRC_CONNECTED state in three scenarios:

first, the UE has downlink data arriving, and the network side initiates paging of the RAN side, which prompts the UE to enter a connected state;

second, the UE initiates an update of RAN location area, such as an update of a periodic RAN location or a cross-area location;

third, the UE has a requirement of an uplink data transmission, which prompts the UE to enter the connected state.

To support a requirement of a higher service rate, the network side supports Dual Connectivity (DC) or Multiple Connectivity (MC). But for the UE adopting a DC/MC manner, how to support the inactive state is a problem needing to be solved.

SUMMARY

The disclosure relates to the technical field of wireless communications, and particularly to a method and device for suspending an RRC connection, and a computer storage medium.

The method for suspending an RRC connection provided by the embodiments of the disclosure may include the following operations.

If a first node determines that a service at the first node side is in a first state, the first node determines that an RRC connection is required to be suspended.

The first node sends a first notification message to a second node, and negotiates with the second node about whether the RRC connection is required to be suspended, the first notification message being used for notifying the second node that the first node determines that the RRC connection is required to be suspended.

If a result of the negotiation between the first node and the second node is that the RRC connection is required to be suspended, the first node sends a first suspension command to a terminal device, the first suspension command being used for triggering the terminal device to suspend the RRC connection and to enter an RRC inactive state.

In an implementation of the disclosure, the operation that the first node determines that the service at the first node side is in the first state may include that:

if the first node has successively received N buffer state reports that a size of a buffer corresponding to a service bearer at the first node side is equal to 0, the first node determines that the service at the first node side is in the first state, N being a positive integer.

In an implementation of the disclosure, the operation that the first node determines that the service at the first node side is in the first state may include the following operations.

If the first node has received a buffer state report that a size of a first buffer corresponding to a service bearer at the first node side is equal to 0, the first node starts a first timer.

If the first node has received a buffer state report that a size of a buffer corresponding to the service bearer at the first node side is not equal to 0 during the running of the first timer, the first node stops the first timer.

If the first timer expires before being triggered to stop, the service at the first node side is determined in the first state.

In an implementation of the disclosure, the operation of negotiating with the second node about whether the RRC connection is required to be suspended may include the following operation.

If a service at the second node side is not in the first state, the first node receives a second notification message from the second node, the second notification message being used for notifying the first node that the RRC connection is disable to be suspended.

In an implementation of the disclosure, the operation of negotiating with the second node about whether the RRC connection is required to be suspended may include the following operation.

If the service at the second node side is in the first state, the first node receives a third notification message from the second node, the third notification message being used for notifying the first node that the RRC connection is able to be suspended.

In an implementation of the disclosure, the operation of negotiating with the second node about whether the RRC connection is required to be suspended may include the following operations.

If the service at the second node side is in the first state, the first node receives a second timer configured by the second node, and starts the second timer.

If the service in the first state occurs in the second node side during the running of the second timer, the first node receives a first indication message from the second node, the first indication message being used for indicating the first node to stop the second timer.

If the second timer expires before being triggered to stop, the first node sends the first suspension command to the terminal device.

In an implementation of the disclosure, the first node is a Master Node (MN) in a DC network or a MC network, and the second node is a Secondary Node (SN) in the DC network or the MC network.

The method for suspending an RRC connection provided by the embodiments of the disclosure may include the following operation.

If the second node determines that the service at the second node side is in the first state, and a result of the second node negotiating with the first node is that a part of the RRC connection is required to be suspended or the second node determines that a part of the RRC connection is required to be suspended, the second node sends a second suspension command to the terminal device, the second suspension command being used for triggering the terminal device to suspend the part of the RRC connection and to enter a partial RRC inactive state. The suspension of the part of the RRC connection refers to the suspension of resources of Secondary Cell Group (SCG).

In an implementation of the disclosure, the method may further include the following operation.

If a result of the second node negotiating with the first node is that the entire RRC connection is required to be suspended, the second node sends a third suspension command to the terminal device through the first node, the third suspension command being used for triggering the terminal device to suspend the entire RRC connection and to enter the RRC inactive state.

In an implementation of the disclosure, the method may further include the following operation.

The second node sends a fourth notification message to the first node, and negotiates with the first node about whether the RRC connection is required to be suspended, the fourth notification message being used for notifying the first node that the second node determines that the RRC connection is required to be suspended.

In an implementation of the disclosure, the operation of negotiating with the first node about whether the RRC connection is required to be suspended may include the following operations.

If a service at the first node side is in the first state, the first node determines that the entire RRC connection is required to be suspended.

If the service at the first node side is not in the first state, the first node determines that a part of the RRC connection is required to be suspended, and the second node receives a fifth notification message from the first node, the fifth notification message being used for notifying the second node that the part of the RRC connection is required to be suspended.

In an implementation of the disclosure, the method may further include the following operation.

After the second node sends the second suspension command to the terminal device, the second node sends a sixth notification message to the first node, the sixth notification message being used for notifying the first node that the terminal device enters the partial RRC inactive state.

In an implementation of the disclosure, after the second node determines that the part of the RRC connection is required to be suspended, the method may further include the following operation.

The second node sends a seventh notification message to the first node, the seventh notification message being used for notifying the first node that the part of the RRC connection is required to be suspended.

In an implementation of the disclosure, the operation that the second node determines that the service at the second node side is in the first state may include the following operation.

If the second node has successively received M buffer state reports that a size of a buffer corresponding to a service bearer at the second node side is equal to 0, the second node determines that the service at the second node side is in the first state, M being a positive integer.

In an implementation of the disclosure, the operation that the second node determines that the service at the second node side is in the first state may include the following operations.

If the second node has received a buffer state report that a size of a first buffer corresponding to a service bearer at the second node side is equal to 0, the second node starts a third timer.

If the second node has received a buffer state report that a size of a buffer corresponding to the service bearer at the second node side is not equal to 0 during the running of the third timer, the second node stops the third timer.

If the third timer expires before being triggered to stop, the second node determines that the service at the second node side is in the first state.

In an implementation of the disclosure, the first node is an MN in the DC network or the MC network, and the second node is an SN in the DC network or the MC network.

The device for suspending an RRC connection provided by the embodiments of the disclosure may include a determining unit, a negotiating unit and a controlling unit.

The determining unit is configured to determine that the RRC connection is required to be suspended if determining that a service at the first node side is in the first state.

The negotiating unit is configured to send the first notification message to the second node, and negotiate with the second node about whether the RRC connection is required to be suspended, the first notification message being used for notifying the second node that the first node determines that the RRC connection is required to be suspended.

The controlling unit is configured to send the first suspension command to the terminal device if a result of the negotiation between the first node and the second node is that the RRC connection is required to be suspended, the first suspension command being used for triggering the terminal device to suspend the RRC connection and to enter the RRC inactive state.

In an implementation of the disclosure, the determining unit may include a first determining subunit.

The first determining subunit is configured to determine that the service at the first node side is in the first state if the first node has successively received N buffer state reports that a size of a buffer corresponding to a service bearer at the first node side is equal to 0, N being a positive integer.

In an implementation of the disclosure, the determining unit may include a second determining subunit.

The second determining subunit is configured to start the first timer if receiving a buffer state report that a size of a first buffer corresponding to a service bearer at the first node side is equal to 0; stop the first timer if receiving a buffer state report that a size of a buffer corresponding to the service bearer at the first node side is not equal to 0 during the running of the first timer; and determine that the service at the first node side is in the first state if the first timer expires before being triggered to stop.

In an implementation of the disclosure, the negotiating unit is configured to receive the second notification message from the second node if the service at the second node side is not in the first state, the second notification message being used for notifying the first node that the RRC connection is disable to be suspended.

In an implementation of the disclosure, the negotiating unit is further configured to receive the third notification message from the second node if the service at the second node side is in the first state, the third notification message being used for notifying the first node that the RRC connection is able to be suspended.

In an implementation of the disclosure, the negotiating unit is further configured to receive the second timer configured by the second node and start the second timer if the service at the second node side is in the first state; and receive the first indication message from the second node if the service in the first state occurs in the second node side during the running of the second timer, the first indication message being used for indicating the first node to stop the second timer. If the second timer expires before being triggered to stop, the controlling unit sends the first suspension command to the terminal device.

In an implementation of the disclosure, the first node is an MN in the DC network or the MC network, and the second node is an SN in the DC network or the MC network.

The device for suspending an RRC connection provided by the embodiments of the disclosure may include a determining unit and a controlling unit.

The determining unit is configured to determine that the service at the second node side is in the first state.

The controlling unit is configured to send the second suspension command to the terminal device if a result of negotiating with the first node is that a part of the RRC connection is required to be suspended or determining that a part of a Radio Resource Control (RRC) connection is required to be suspended, the second suspension command being used for triggering the terminal device to suspend a part of the RRC connection and to enter the partial RRC inactive state. The suspension of the part of the RRC connection refers to the suspension of the resources of SCG.

In an implementation of the disclosure, if a result of the second node negotiating with the first node is that the entire RRC connection is required to be suspended, the third suspension command is sent to the terminal device through the first node, the third suspension command being used for triggering the terminal device to suspend the entire RRC connection and to enter the RRC inactive state.

In an implementation of the disclosure, the device may further include a negotiating unit.

The negotiating unit is configured to send the fourth notification message to the first node, and negotiate with the first node about whether the RRC connection is required to be suspended, the fourth notification message being used for notifying the first node that the second node determines that the RRC connection is required to be suspended.

In an implementation of the disclosure, the operation of negotiating with the first node about whether the RRC connection is required to be suspended may include the following operation.

If a service at the first node side is in the first state, the first node determines that the entire RRC connection is required to be suspended.

If the service at the first node side is not in the first state, the first node determines that a part of the RRC connection is required to be suspended, and the fifth notification message is received from the first node, the fifth notification message being used for notifying the second node that a part of the RRC connection is suspended.

In an implementation of the disclosure, the controlling unit is further configured to send the sixth notification message to the first node after sending the second suspension command to the terminal device, the sixth notification message being used for notifying the first node that the terminal device enters the partial RRC inactive state.

In an implementation of the disclosure, the negotiating unit is further configured to send the seventh notification message to the first node after determining that the part of the RRC connection is required to be suspended, the seventh notification message being used for notifying the first node that the part of the RRC connection is required to be suspended.

In an implementation, the determining unit is configured to determine that the service at the second node side is in the first state if the second node has successively received M buffer state reports that a size of a buffer corresponding to a service bearer at the second node side is equal to 0, M being a positive integer.

In an implementation of the disclosure, the determining unit is configured to start the third timer if receiving a buffer state report that a size of a first buffer corresponding to the service bearer at the second node side is equal to 0; and stop the third timer if receiving a buffer state report that a size of a buffer corresponding to the service bearer at the second node side is not equal to 0 during the running of the third timer. If the third timer expires before being triggered to stop, the determining unit determines the service at the second node side in the first state.

In an implementation of the disclosure, the first node is an MN in the DC network or the MC network, and the second node is an SN in the DC network or the MC network.

The computer-readable storage medium having stored therein a computer executable instruction is provided by the embodiments of the disclosure. The computer-executable instruction, when executed by a processor, performs the method for suspending an RRC connection.

BRIEF DESCRIPTION OF THE DRAWINGS

The accompanying drawings described here are used for providing further understanding of the disclosure, and constitute a part of the present application. Schematic embodiments of the disclosure and description thereof are used for illustrating the disclosure and not intended to form an improper limit to the disclosure. In the accompanying drawings:

FIG. 3 is a second flowchart of a method for suspending an RRC connection according to an embodiment of the disclosure;

FIG. 4 is a third flowchart of a method for suspending an RRC connection according to an embodiment of the disclosure;

FIG. 5 is a fourth flowchart of a method for suspending an RRC connection according to an embodiment of the disclosure;

DETAILED DESCRIPTION

In order to understand characteristics and technical contents in the embodiments of the present disclosure in more detail, the implementation of the embodiments of the disclosure is elaborated in combination with the accompanying drawings. The accompanying drawings are only used for reference, but not intended to limit the embodiments of the disclosure.

The technical solutions of the embodiments of the disclosure are mainly applied to a 5G mobile communication system. Certainly, the technical solutions of the embodiments of the disclosure are not limited to the 5G mobile communication system, but may also be applied to other types of mobile communication systems. The main application scenarios in the 5G mobile communication system are described below.

1) eMBB scenario: eMBB aims at user's access to multimedia contents, services and data, and its service needs grow rapidly. Because eMBB may be deployed in different scenarios, such as indoor, urban, country, etc., its service capabilities and requirements vary greatly, so it is necessary to analyze the services in combination with specific deployment scenarios.

2) URLLC scenario: typical applications of URLLC include: industrial automation, electrical automation, telemedicine operations, traffic safety assurance, etc.

3) mMTC scenario: typical features of mMTC include: high connection density, small data volume, delay insensitive services, low cost and long service life of modules, etc.

Three RRC states in a 5G network environment are described below.

1) RRC_IDLE state: the mobility is UE-based re-selection of cell selection, the paging is initiated by the CN, and the paging area is configured by the CN. There is no UE AS context at the base station side. There is no RRC connection.

2) RRC_CONNECTED state: there is the RRC connection, and there is the UE AS context at the base station and the UE. The network side knows that the location of the UE is a specific cell level. The mobility is controlled by the network side. Unicast data may be transmitted between the UE and the base station.

3) RRC_INACTIVE state: the mobility is UE-based re-selection of cell selection, there is a connection between the CN and the RAN, the UE AS context exists on a certain base station, the paging is triggered by the RAN, an RAN-based paging area is managed by the RAN, and the network side knows that the location of the UE is an RAN-based paging area level.

Figure 1:
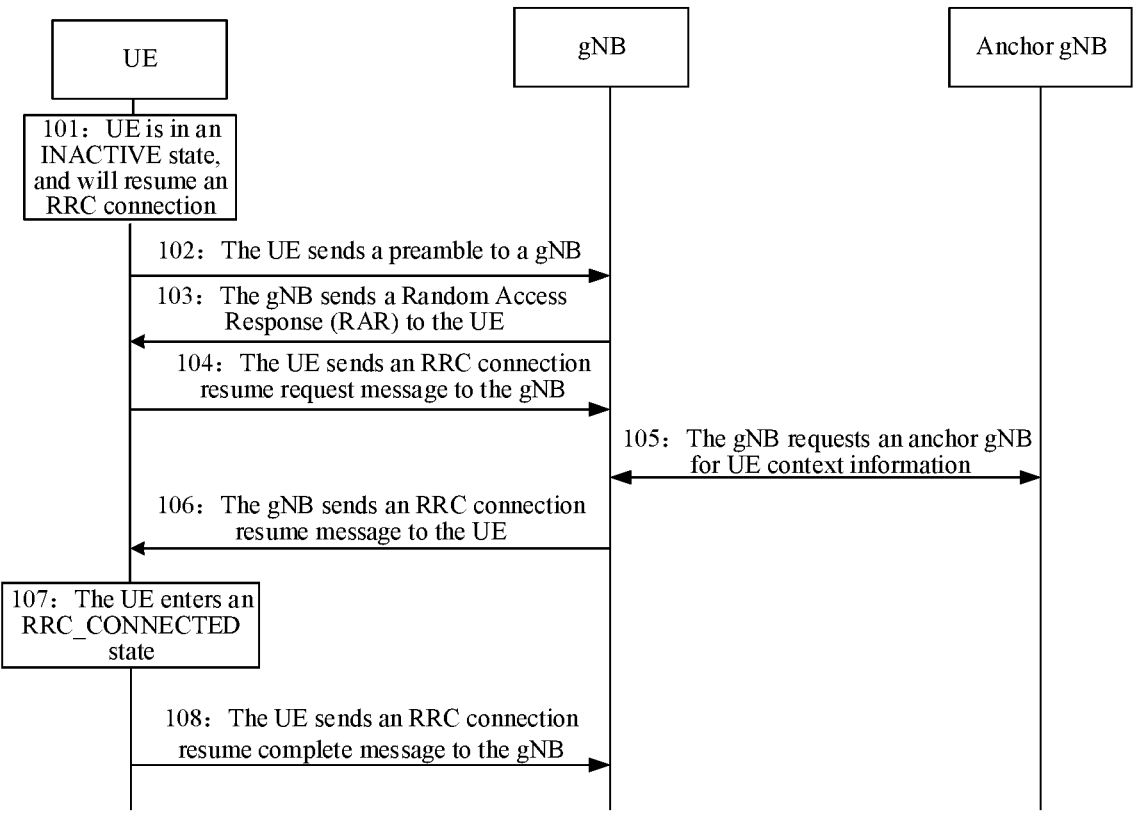
FIG. 1 is a schematic diagram of an RRC connection resume process.

FIG. 1 is a schematic diagram of an RRC connection resume process. As shown in FIG. 1, the RRC connection resume process includes the following operations.

At S101, UE is in an inactive state, and will resume an RRC connection.

At S102, the UE sends a preamble to a gNB.

At S103, the gNB sends a Random Access Response (RAR) to the UE.

At S104, the UE sends an RRC connection resume request message to the gNB.

At S105, the gNB requests an anchor gNB for UE context information.

At S106, the gNB sends an RRC connection resume message to the UE.

At S107, the UE enters an RRC_CONNECTED state.

At S108, the UE sends an RRC connection resume complete message to the gNB.

The technical solutions of the embodiments of the disclosure define two new concepts, namely a full RRC connection suspension and a partial RRC connection suspension, and enable a network side and a UE side to support the inactive state. It should be noted that the full RRC connection suspension refers to the suspension of the entire RRC connection, and the partial RRC connection suspension refers to the suspension of a part of the RRC connection. Further, the suspension of a part of the RRC connection refers to the suspension of resources of an SCG part.

Figure 2:
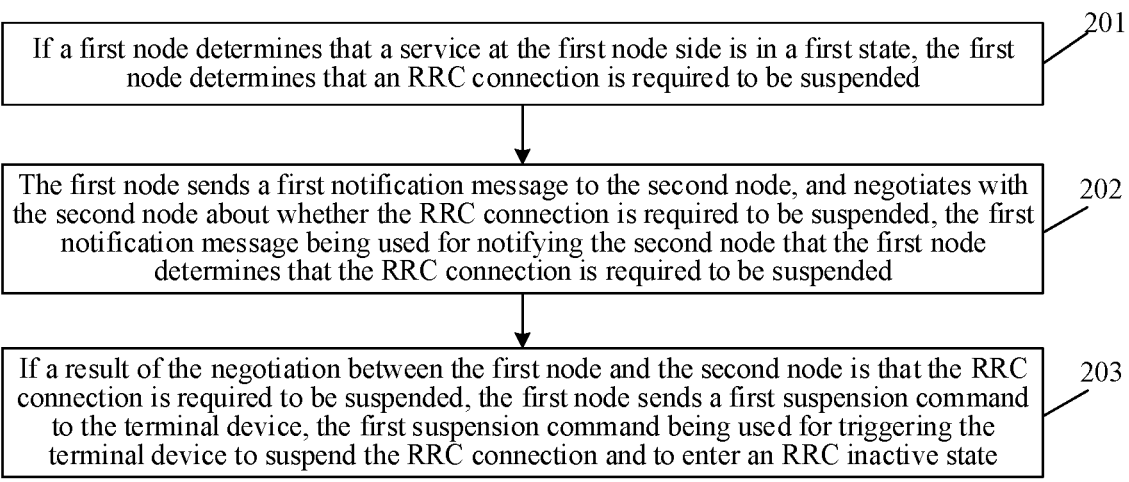
FIG. 2 is a first flowchart of a method for suspending an RRC connection according to an embodiment of the disclosure.

FIG. 2 is a first flowchart of a method for suspending an RRC connection according to an embodiment of the disclosure. As shown in FIG. 2, the method for suspending an RRC connection may include the following steps.

At S201, if a first node determines that a service at the first node side is in a first state, the first node determines that an RRC connection is required to be suspended.

In the embodiments of the disclosure, the first node is an MN in the DC network or the MC network, and the second node is an SN in the DC network or the MC network. In the embodiments of the disclosure, it is an initial RRC connection suspension process of the MN. Specifically, the RRC connection suspension process is triggered if the MN side detects that the service is in the first state. Here, the first state of the service means that the service is in an inactive state. Relative to the first state, there is also a state called a second state, namely an active state. It shall be understood that the service is not in the first state mentioned in the following embodiments of the disclosure means that the service is in the active state.

In the embodiments of the disclosure, the first node may determine that the service at the first node side is in the first state in the following manners.

First manner, if the first node has successively received N buffer state reports that a size of a buffer corresponding to a service bearer at the first node side is equal to 0 (namely BSR=0), the first node determines that the service at the first node side is in the first state, N being a positive integer.

For example, if the MN side has successively received N reports that the BSR corresponding to the service bearer at the MN side is equal to, the MN determines to suspend the RRC connection, and then notifies the SN and negotiate the determination with the SN.

Second manner, if the first node has received a buffer state report that a size of a first buffer corresponding to the service bearer at the first node side is equal to 0, the first node starts the a first timer; if the first node has received a buffer state report that a size of a buffer corresponding to the service bearer at the first node side is not equal to 0 during the running of the first timer, the first node stops the first timer. If the first timer expires before being triggered to stop, the first node determines that the service at the first node side is in the first state.

For example, if the MN side receives the report that the first BSR corresponding to the service bearer at the MN side is equal to 0, the MN starts the timer 1; and if the MN side receives again the report that the BSR corresponding to the service bearer at the MN side is not equal to 0, the MN stops the timer 1. If the timer 1 expires, the MN determines to suspend the RRC connection, notifies the SN and negotiates the determination with the SN.

At S202, the first node sends a first notification message to the second node, and negotiates with the second node about whether the RRC connection is required to be suspended, the first notification message being used for notifying the second node that the first node determines that the RRC connection is required to be suspended.

In the embodiments of the disclosure, the operation of negotiating with the second node about whether the RRC connection is required to be suspended may specifically include the following operations.

1) If a service at the second node side is not in the first state, the first node receives a second notification message sent by the second node, the second notification message being used for notifying the first node that the RRC connection is disable to be suspended.

For example, if the service at the SN side is active, the SN notifies the MN that there is active service and the RRC connection is disable to be suspended.

2) If the service at the second node side is in the first state, the first node receives a third notification message sent by the second node, the third notification message being used for notifying the first node that the RRC connection is able to be suspended.

For example, if the service at the SN side is inactive, the SN notifies the MN that the RRC connection is able to be suspended immediately.

3) If the service at the second node side is in the first state, the first node receives a second timer configured by the second node and starts the second timer; and if the service in the first state occurs in the second node side during the running of the second timer, the first node receives a first indication message sent by the second node, the first indication message being used for indicating the first node to stop the second timer. If the second timer expires before being triggered to stop, the first node sends the first suspension command to a terminal device.

For example, if the service at the SN side is inactive, the SN configures a timer 2 to the MN, and the MN starts the timer 2 after receiving the timer 2; if the timer expires, the MN issues a command of suspending the RRC connection to the UE. If an active service occurs in the SN side during the running of the timer, the SN notifies the MN to stop the timer 2.

At S203, if a result of the negotiation between the first node and the second node is that the RRC connection is required to be suspended, the first node sends a first suspension command to the terminal device, the first suspension command being used for triggering the terminal device to suspend the RRC connection and to enter an RRC inactive state.

For example, the MN issues the command of suspending the RRC connection to the UE through an RRC release message to notify the UE to enter the INACIVE state.

In the technical solutions of the embodiments of the disclosure, 1) if the first node determines that the service at the first node side is in the first state, the first node determines the RRC connection is required to be suspended; the first node sends the first notification message to the second node, and negotiates with the second node about whether the RRC connection is required to be suspended, the first notification message being used for notifying the second node that the first node determines that the RRC connection is required to be suspended; if the result of the negotiation between the first node and the second node is that the RRC connection is required to be suspended, the first node sends the first suspension command to the terminal device, the first suspension command being used for triggering the terminal device to suspend the RRC connection and to enter the RRC inactive state; 2) if the second node determines that the service at the second node side is in the first state, the second node determines that the RRC connection is required to be suspended; the second node sends the fourth notification message to the first node, and negotiates with the first node about whether the RRC connection is required to be suspended, the fourth notification message being used for notifying the first node that the second node determines that the RRC connection is required to be suspended; if the result of the negotiation between the first node and the second node is that a part of the RRC connection is required to be suspended, the second node sends the second suspension command to the terminal device, the second suspension command being used for triggering the terminal device to suspend the part of the RRC connection and to enter the RRC inactive state. The suspension of a part of the RRC connection refers to the suspension of the resources of SCG. If the result of the negotiation between the first node and the second node is that the entire RRC connection is required to be suspended, the third suspension command is sent to the terminal device through the first node, the third suspension command being used for triggering the terminal device to suspend the entire RRC connection and to enter the RRC inactive state. With the technical solutions of the embodiments of the disclosure, the UE is supported to enter the RRC inactive state and the partial RRC inactive state, and the UE can support the inactive state in a DC/MC mode, thereby achieving the purpose of fast resuming the RRC connection in DC/MC mode, and reducing an RRC connection establishment delay and an interruption delay of user side services. In addition, the introduction of the partial RRC inactive state can save power consumption of the UE.

FIG. 3 is a second flowchart of a method for suspending an RRC connection according to an embodiment of the disclosure. As shown in FIG. 3, the method for suspending an RRC connection may include the following steps.

At S301, if the second node determines that the service at the second node side is in the first state, and a result of the second node negotiating with the first node is that a part of the RRC connection is required to be suspended or the second node determines that a part of the RRC connection is required to be suspended, the second node sends a second suspension command to the terminal device, the second suspension command being used for triggering the terminal device to suspend the part of the RRC connection and to enter a partial RRC inactive state. The suspension of the part of the RRC connection means the suspension of the resources of the SCG part.

In the embodiments of the disclosure, the first node is the MN in the DC network or the MC network, and the second node is the SN in the DC network or the MC network. In the embodiments of the disclosure, it is an initial RRC connection suspension process of the SN. Specifically, the RRC connection suspension process is triggered if the SN side detects that the service is in the first state. Here, the first state of the service means that the service is in an inactive state. Relative to the first state, there is also a state called a second state, namely an active state. It shall be understood that the service is not in the first state mentioned in the following embodiments of the disclosure means that the service is in the active state.

In the embodiments of the disclosure, the second node may determine that the service at the second node side is in the first state in the following manners.

First manner, if the second node has successively received M buffer state reports that a size of a buffer corresponding to a service bearer at the second node side is equal to 0 (namely BSR=0), the second node determines that the service at the second node side is in the first state, M being a positive integer.

For example, the SN side has successively received M reports that the BSR corresponding to the service bearer at the SN side is equal to, the SN determines to suspend the RRC connection, and then notifies the MN and negotiate the determination with the MN.

Second manner, if the second node has received a buffer state report that the size of the first buffer corresponding to the service bearer at the second node side is equal to 0, the second node starts a third timer; if the second node has received a buffer state report that a size of a buffer corresponding to the service bearer at the second node side is not equal to 0 during the running of the third timer, the second node stops the third timer. If the third timer expires before being triggered to stop, the second node determines the service at the second node side is in the first state.

For example, if the SN side receives the report that the first BSR corresponding to the service bearer at the SN side is equal to 0, the SN starts a timer 3; and if the SN side receives again the report that the BSR corresponding to the service bearer at the SN side is not equal to 0, the SN stops the timer 3. If the timer 3 expires, the SN determines to suspend the RRC connection, and notifies the MN and negotiates the determination with the MN.

In the embodiments of the disclosure, there are two implementations about whether the RRC connection is required to be suspended.

First manner, whether to suspend the entire RRC connection or a part of the RRC connection is determined by the first node. Specifically, if the service at the first node side is not in the first state, the first node determines that a part of the RRC connection is required to be suspended; if the service at the first node side is in the first state, the first node determines that the entire RRC connection is required to be suspended.

Second manner, the suspension of a part of the RRC connection is determined by the second node. Specifically, after the second node determines that the service at the second node side is in the first state, the second node directly determines that a part of the RRC connection is required to be suspended.

For the first manner, the second node sends a fourth notification message to the first node, and negotiates with the first node about whether the RRC connection is required to be suspended, the fourth notification message being used for notifying the first node that the second node determines that the RRC connection is required to be suspended. 1) If the service at the first node side is not in the first state, the first node determines that a part of the RRC connection is required to be suspended, and the second node receives a fifth notification message sent by the first node, the fifth notification message being used for notifying the second node that a part of the RRC connection is required to be suspended. For example, if there is active service at the MN, the MN determines that the UE enters the partial RRC inactive state, namely only suspending the SCG part. The MN will notify the SN to suspend a part of the RRC connection, and the SN uses a Signaling Radio Bearer (SRB) 3 to suspend the resources of the SCG part. After issuing the suspension command to the UE, the SN notifies the MN side that the UE enters the partial RRC inactive state. 2) If a result of the second node negotiating with the first node is that the entire RRC connection is required to be suspended, the second node sends the third suspension command to the terminal device through the first node, the third suspension command being used for triggering the terminal device to suspend the entire RRC connection and to enter the RRC inactive state. Here, if the service at the first node side is in the first state, the first node determines that the entire RRC connection is required to be suspended; For example, if the service at the MN side is inactive, the MN may determine that the entire RRC connection is required to be suspended, and issues the command of suspending the RRC connection (for example, the RRC release message) to the UE, so as to notify the UE to enter the inactive state. In addition, the MN notifies the SN that the UE enters the inactive state.

For the second manner, after the second node determines that a part of the RRC connection is required to be suspended, the second node sends a seventh notification message to the first node, the seventh notification message being used for notifying the first node that a part of the RRC connection is required to be suspended. Further, if a result of the second node negotiating with the first node is that a part of the RRC connection is required to be suspended, the second node sends the second suspension command (for example, the command of suspending the SCG part which is sent to the UE through the SRB3) to the terminal device, the second suspension command being used for triggering the terminal device to suspend a part of the RRC connection and to enter the partial RRC inactive state. The suspension of a part of the RRC connection means the suspension of the resources of the SCG part.

FIG. 4 is a third flowchart of a method for suspending an RRC connection according to an embodiment of the disclosure. As shown in FIG. 4, the method for suspending an RRC connection may include the following steps.

At S401, the MN detects that the service at the MN side is inactive and notifies the SN.

At S402, the MN negotiates with the SN about whether the RRC connection is required to be suspended; if a result of the negotiation between the MN and the SN is that the RRC connection is required to be suspended, S403 is performed; or else, the process is ended.

Here, 1) if the service at the SN side is active, the SN notifies the MN that there is active service and the RRC connection is disable to be suspended. 2 If the service at the SN side is inactive, the SN notifies the MN that the RRC connection is able to be suspended immediately. 3) If the service at the SN side is inactive, the SN configures the timer 2 to the MN, and the MN starts the timer 2 after receiving the timer 2; if the timer expires, the MN issues the command of suspending the RRC connection to the UE. If the active service occurs in the SN side during the running of the timer, the SN notifies the MN to stop the timer 2.

At S403, the MN issues the suspension command to the UE to trigger the UE to enter the inactive state.

FIG. 5 is a fourth flowchart of a method for suspending an RRC connection according to an embodiment of the disclosure. As shown in FIG. 5, the method for suspending an RRC connection may include the following steps.

At S501, the SN detects that the service at the SN side is inactive and notifies the MN.

At S502, the SN negotiates with the MN about whether the RRC connection is required to be suspended; if a result of negotiation is that the entire RRC connection is required to be suspended, S503 is performed; and if a result of negotiation is that a part of the RRC connection is required to be suspended, S504 is performed; or else, the process is ended.

Here, MN determines whether to suspend the RRC connection in the following manners: 1) if the service at the MN side is inactive too, the MN may determine that the entire RRC connection is required to be suspended; and 2) if there is the active service at the MN side, the MN determines that a part of the RRC connection is required to be suspended, that is, only the SCG part is to be suspended.

The SN determines whether to suspend the RRC connection in the following manner: if the SN detects that the service at the SN side is inactive, the SN directly determines that a part of the RRC connection is required to be suspended, and then notifies the MN that the SN enters the inactive state (that is, partial inactive state).

At S503, the MN or the SN issues the suspension command to the UE to trigger the UE to enter the inactive state.

Here, if whether to suspend the RRC connection is determined by the MN, the MN issues the suspension command to the UE; and if whether to suspend the RRC connection is determined by the SN, the SN issues the suspension command to the UE.

At S504, the SN issues the suspension command to the UE to trigger the UE to enter a partially inactive state.

Figure 6:
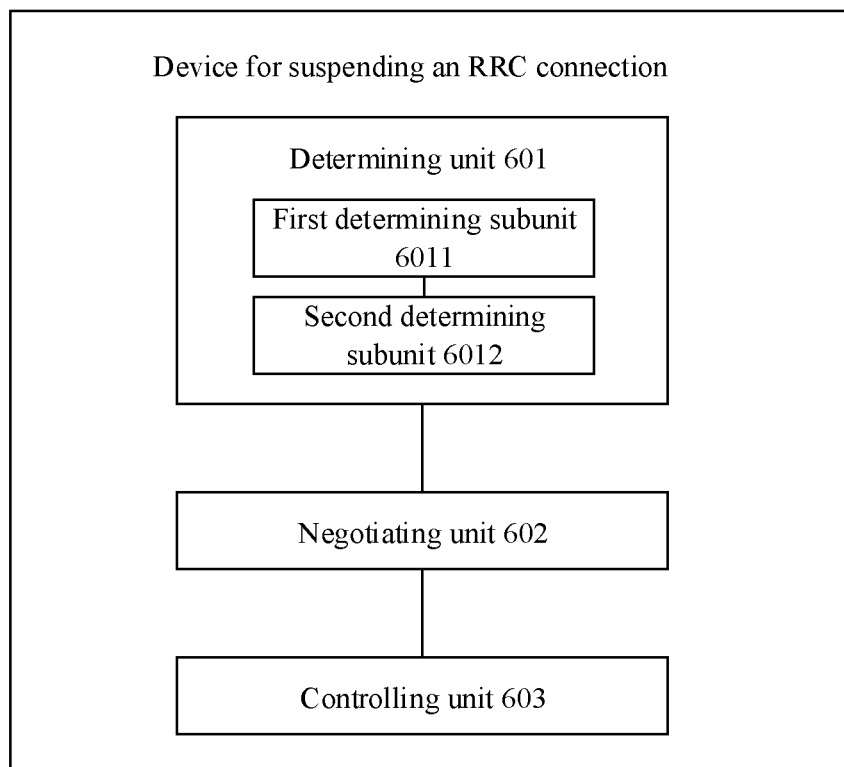
FIG. 6 is a first structural schematic diagram of a device for suspending an RRC connection according to an embodiment of the disclosure.

FIG. 6 is a first structural schematic diagram of a device for suspending an RRC connection according to an embodiment of the disclosure. As shown in FIG. 6, the device for suspending an RRC connection may include a determining unit 601, a negotiating unit 602, and a controlling unit 603.

The determining unit 601 is configured to determine that the RRC connection is required to be suspended if it is determined that the service at the first node side is in the first state.

The negotiating unit 602 is configured to send the first notification message to the second node, and negotiate with the second node about whether the RRC connection is required to be suspended, the first notification message being used for notifying the second node that the first node determines that the RRC connection is required to be suspended.

The controlling unit 603 is configured to send the first suspension command to the terminal device if a result of negotiating with the second node is that the RRC connection is required to be suspended, the first suspension command being used for triggering the terminal device to suspend the RRC connection and to enter the RRC inactive state.

In an implementation, the determining unit 601 may include a first determining subunit 6011.

The first determining subunit 6011 is configured to determine that the service at the first node side is in the first state if the first node has successively received N buffer state reports that a size of a buffer corresponding to the service bearer at the first node side is equal to 0, N being a positive integer.

In an implementation, the determining unit 601 may include a second determining subunit 6012.

The second determining subunit 6012 is configured to: start the first timer if receiving the buffer state report that a size of a first buffer corresponding to the service bearer at the first node side is equal to 0; stop the first timer if receiving the buffer state report that the size of the buffer corresponding to the service bearer at the first node side is not equal to 0 during the running of the first timer; and determine that the service at the first node side is in the first state if the first timer expires before being triggered to stop.

In an implementation, the negotiating unit 602 is configured to receive the second notification message sent by the second node if the service at the second node side is not in the first state, the second notification message being used for notifying the first node that the RRC connection is disable to be suspended.

In an implementation, the negotiating unit 602 is further configured to receive the third notification message sent by the second node if the service at the second node side is in the first state, the third notification message being used for notifying the first node that the RRC connection is able to be suspended.

In an implementation, the negotiating unit 602 is further configured to: receive the second timer configured by the second node and start the second timer if the service at the second node side is in the first state; and receive the first indication message sent by the second node if the service in the first state occurs in the second node side during the running of the second timer, the first indication message being used for indicating the first node to stop the second timer. If the second timer expires before being triggered to stop, the controlling unit sends the first suspension command to the terminal device.

In an implementation, the first node is an MN in the DC network or the MC network, and the second node is an SN in the DC network or the MC network.

Those skilled in the art should understand that the implemented function of each unit in the device for suspending an RRC connection as shown in FIG. 6 may be understood with reference to the related description of the method for suspending an RRC connection. The functions of each unit in the device for suspending an RRC connection shown in FIG. 6 may be realized through a program running in a processor, and may also be realized through a specific logical circuit.

Figure 7:
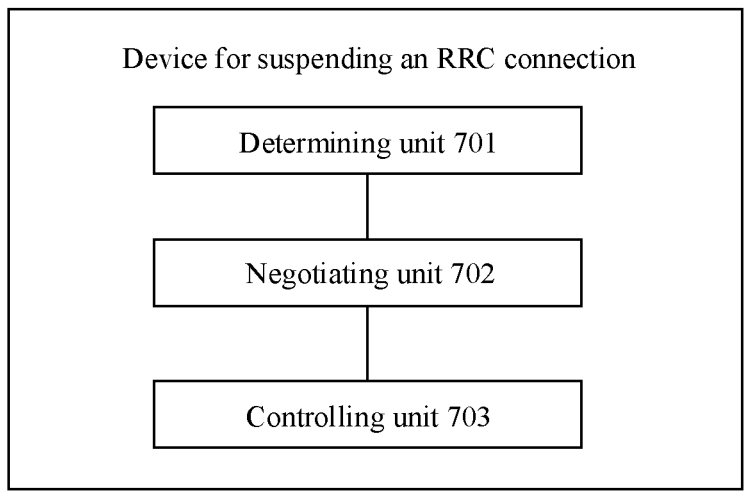
FIG. 7 is a second structural schematic diagram of a device for suspending an RRC connection according to an embodiment of the disclosure.

FIG. 7 is a second structural schematic diagram of a device for suspending an RRC connection according to an embodiment of the disclosure. As shown in FIG. 7, the device for suspending an RRC connection may include a determining unit 701 and a controlling unit 703.

The determining unit 701 is configured to determine that the RRC connection is required to be suspended if it is determined that the service at the second node side is in the first state.

The controlling unit 703 is configured to send the second suspension command to the terminal device if a result of negotiating with the first node is that a part of the RRC connection is required to be suspended, the second suspension command being used for triggering the terminal device to suspend a part of the RRC connection and to enter the partial RRC inactive state. The suspension of a part of the RRC connection means the suspension of the resources of the SCG part.

In an implementation, if a result of the second node negotiating with the first node is that the entire RRC connection is required to be suspended, the third suspension command is sent to the terminal device through the first node, the third suspension command being used for triggering the terminal device to suspend the entire RRC connection and to enter the RRC inactive state.

In an implementation, the device may further include: a negotiating unit 702, configured to send the fourth notification message to the first node, and negotiate with the first node about whether the RRC connection is required to be suspended, the fourth notification message being used for notifying the first node that the second node determines that the RRC connection is required to be suspended.

In an implementation, the operation of negotiating with the first node about whether the RRC connection is required to be suspended may include the following operations.

If the service at the first node side is in the first state, the first node determines that the entire RRC connection is required to be suspended.

If the service at the first node side is not in the first state, the first node determines that a part of the RRC connection is required to be suspended, and the fifth notification message is received from the first node, the fifth notification message being used for notifying the second node that a part of the RRC connection is required to be suspended.

In an implementation, the controlling unit 703 is further configured to send the sixth notification message to the first node after sending the second suspension command to the terminal device, the sixth notification message being used for notifying the first node that the terminal device enters the partial RRC inactive state.

In an implementation, the negotiating unit 702 is further configured to send the seventh notification message to the first node after determining that a part of the RRC connection is required to be suspended, the seventh notification message being used for notifying the first node that a part of the RRC connection is required to be suspended.

In an implementation, the determining unit 701 is configured to determine that the service at the second node side is in the first state if the second node has successively received M buffer state reports that the size of the buffer corresponding to the service bearer at the second node side is equal to 0, M being a positive integer.

In an implementation, the determining unit 701 is configured to start the third timer if receiving the buffer state report that the size of the first buffer corresponding to the service bearer at the second node side is equal to 0; and stop the third timer if receiving the buffer state report that the size of the buffer corresponding to the service bearer at the second node side is not equal to 0 during the running of the third timer. If the third timer expires before being triggered to stop, the determining unit determines the service at the second node side in the first state.

In an implementation, the first node is an MN in the DC network or the MC network, and the second node is an SN in the DC network or the MC network.

Those skilled in the art should understand that the implemented function of each unit in the device for suspending an RRC connection as shown in FIG. 7 may be understood with reference to the related description of the method for suspending an RRC connection. The functions of each unit in the device for suspending an RRC connection shown in FIG. 7 may be realized through a program running in a processor, and may also be realized through a specific logical circuit.

When being implemented in form of software functional module and sold or used as an independent product, the device for suspending an RRC connection of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, which stores a computer-executable instruction thereon. The computer-executable instruction, when executed by a processor, performs the method for suspending an RRC connection provided by the embodiments of the disclosure.

Figure 8:
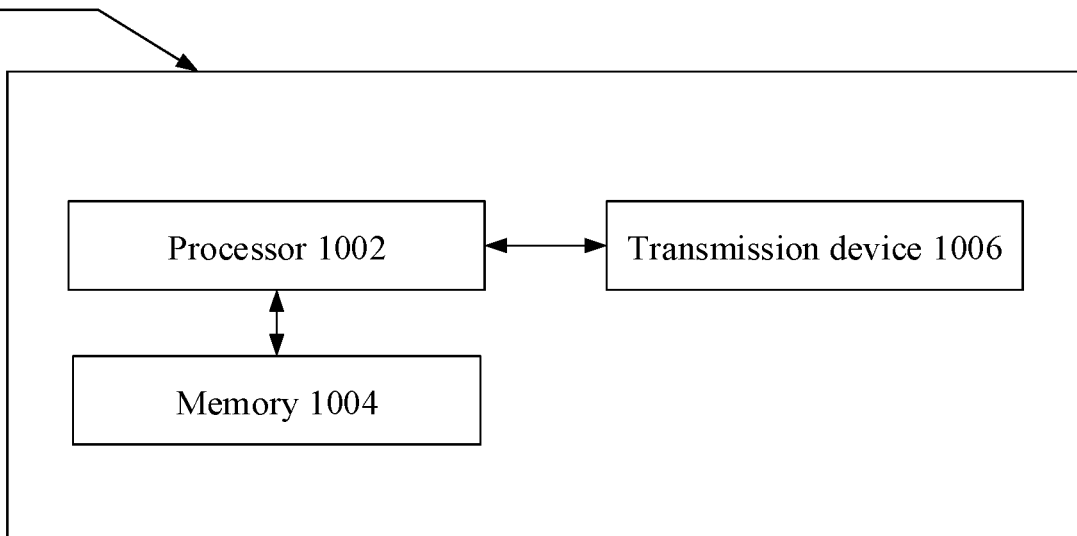
FIG. 8 is a structural schematic diagram of a computer device according to an embodiment of the disclosure.

FIG. 8 is a structural schematic diagram of a computer device according to an embodiment of the disclosure. The computer device may be either a terminal or a network device. As shown in FIG. 8, the computer device 100 may include one or more (only one is shown in figure) processors 1002 (processor 1002 may include but not limited to a Micro Controller Unit (MCU) or a Field Programmable Gate Array (FPGA) and other processing devices), a memory 1004 for storing data, and a transmission apparatus 1006 for a communication function. Those of ordinary skill in the art should know that the structure shown in FIG. 8 is only schematic and not intended to limit the structure of the electronic device. For example, the computer device 100 may further include components more or fewer than the components shown in FIG. 8 or has a configuration different from that shown in FIG. 8.

The memory 1004 may be configured to store a software program of application software and a module, for example, a program instruction/module corresponding to a resource allocation method in the embodiments of the disclosure. The processor 1002 runs the software program and module stored in the memory 1004, thereby executing various functional applications and data processing, namely implementing the above-mentioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementations of the disclosure and not intended to limit the protection scope of the disclosure; any change or replacement that those skilled in the art can think of easily in the scope of technologies disclosed by the disclosure shall fall within the protection scope of the disclosure.

The invention claimed is:

1. A method for suspending a Radio Resource Control (RRC) connection, comprising:
   sending, by a first node, a first notification message to a second node, and negotiating with the second node about whether an RRC connection is required to be suspended, the first notification message being used for notifying the second node that the first node determines that the RRC connection is required to be suspended; and
   if a result of the negotiation between the first node and the second node is that the RRC connection is required to be suspended, sending, by the first node, a first suspension command to a terminal device, the first suspension command being used for triggering the terminal device to suspend the RRC connection and to enter an RRC inactive state,
   wherein the first node is a Master Node (MN) in a Dual Connectivity (DC) network or a Multiple Connectivity (MC) network, and the second node is a Secondary Node (SN) in the DC network or the MC network, and the first node and the second node are nodes of access network side; wherein negotiating with the second node about whether the RRC connection is required to be suspended comprises:
   receiving, by the first node, a second timer configured by the second node, and starting the second timer; and
   during the running of the second timer, receiving, by the first node, a first indication message from the second node, the first indication message being used for indicating the first node to stop the second timer;
   wherein if the second timer expires before being triggered to stop, sending, by the first node, the first suspension command to the terminal device.

2. The method of claim 1, wherein negotiating with the second node about whether the RRC connection is required to be suspended comprises:
   receiving, by the first node, a second notification message from the second node, the second notification message being used for notifying the first node that the RRC connection is disable to be suspended.

3. The method of claim 1, wherein negotiating with the second node about whether the RRC connection is required to be suspended comprises:
   receiving, by the first node, a third notification message from the second node, the third notification message being used for notifying the first node that the RRC connection is able to be suspended.

4. A first node for suspending an RRC connection, comprising:
   a processor, configured to control a transmission device to send a first notification message to a second node, and configured to negotiate with the second node about whether the RRC connection is required to be suspended, the first notification message being used for notifying the second node that the first node determines that the RRC connection is required to be suspended; and
   control the transmission device to send a first suspension command to a terminal device if a result of negotiating with the second node is that the RRC connection is required to be suspended, the first suspension command being used for triggering the terminal device to suspend the RRC connection and to enter an RRC inactive state,
   wherein the first node is a Master Node (MN) in a Dual Connectivity (DC) network or a Multiple Connectivity (MC) network, and the second node is a Secondary Node (SN) in the DC network or the MC network, and the first node and the second node are nodes of access network side; wherein the processor is further configured to control the transmission device to:
   receive a second timer configured by the second node and start the second timer; and
   receive a first indication message from the second node during the running of the second timer, the first indication message being used for indicating the first node to stop the second timer;
   wherein if the second timer expires before being triggered to stop, the processor is further configured to control the transmission device to send the first suspension command to the terminal device.

5. The first node of claim 4, wherein the processor is configured to control the transmission device to receive a second notification message from the second node, the second notification message being used for notifying the first node that the RRC connection is disable to be suspended.

6. The first node of claim 4, wherein the processor is further configured to control the transmission device to receive a third notification message from the second node, the third notification message being used for notifying the first node that the RRC connection is able to be suspended.

* * * * *